United States Patent
Davis et al.

(10) Patent No.: US 6,582,150 B1
(45) Date of Patent: Jun. 24, 2003

(54) METHOD AND APPARATUS FOR REMOVAL AND ASSEMBLY OF A DEVICE WITHIN A CHASSIS

(75) Inventors: David R. Davis, Jefferson, SD (US); David D. Williams, El Paso, TX (US); Daniel C. Castillo, El Paso, TX (US); Jorge A. Moriel, El Paso, TX (US); John J. Daly, Irvine, CA (US); James Foster Knutson, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 21 days.

(21) Appl. No.: 09/636,013

(22) Filed: Aug. 10, 2000

(51) Int. Cl.[7] .................................................. H05K 7/16
(52) U.S. Cl. ..................... 403/330; 403/386; 361/726; 361/725
(58) Field of Search ................................. 403/329, 330, 403/256, 373, 374.1, 374.2, 386; 361/725, 726, 732; 174/48, 49, 52.1, 138 G (56) References Cited

U.S. PATENT DOCUMENTS

| | | | |
|---|---|---|---|
| 1,389,072 A | * 8/1921 | Rosenberg | 2925/114 |
| 5,032,952 A | 7/1991 | Cooke et al. | 361/392 |
| 5,587,881 A | 12/1996 | Wang | 361/695 |
| 5,612,854 A | 3/1997 | Wiscombe et al. | 361/727 |
| 5,673,175 A | * 9/1997 | Carney | 361/686 |
| 5,680,293 A | * 10/1997 | McAnally et al. | 361/685 |
| 5,777,848 A | * 7/1998 | McAnally | 361/725 |
| 5,790,372 A | 8/1998 | Dewey et al. | 361/683 |
| 5,808,867 A | 9/1998 | Wang | 361/695 |
| 5,822,196 A | * 10/1998 | Hastings et al. | 361/801 |
| 5,949,652 A | * 9/1999 | McAnally | 361/726 |
| 5,973,918 A | 10/1999 | Felcman et al. | 361/683 |
| 5,993,241 A | 11/1999 | Olson et al. | 439/378 |
| 6,040,980 A | * 3/2000 | Johnson | 361/685 |
| 6,236,563 B1 | * 5/2001 | Buican et al. | 361/685 |
| 6,246,571 B1 | * 6/2001 | Lin et al. | 361/683 |
| 6,270,046 B1 | * 8/2001 | Liu | 248/231.9 |
| 6,272,009 B1 | * 8/2001 | Buican | 361/683 |

* cited by examiner

Primary Examiner—Lynne H. Browne
Assistant Examiner—Michael P. Ferguson
(74) Attorney, Agent, or Firm—Scott Charles Richardson; William J. Breen, III; Suiter - West (57) ABSTRACT

A device retention mechanism suitable for mounting a device in a chassis includes a chassis suitable for receiving a device. The chassis has a first side and a second side, the first side oriented generally perpendicular to the second side. A retention member is mounted to the first side of the chassis to enable the retention member to exert a force against a device, thereby applying the force from the retention member to the device and to the second side of the chassis, thereby securing the device in the chassis.

22 Claims, 6 Drawing Sheets

METHOD AND APPARATUS FOR REMOVAL AND ASSEMBLY OF A DEVICE WITHIN A CHASSIS

FIELD OF THE INVENTION

The present invention generally relates to the field of a chassis for an electronic device, and particularly to a method and apparatus for removal and assembly of a device within a chassis.

BACKGROUND OF THE INVENTION

The manufacture and assembly of information handling systems has become increasingly more competitive. Manufacturers continually strive to improve the design and features of information handling systems yet still offer competitive prices. One such area of improvement is in the mounting of devices in an information handling system. An information handling system, such as a typical desktop system, tower, server, and the like, may include information handling system devices, such as power supplies, disk drives, compact disk read-only memories (CD-ROMs), digital video disc (DVD), or 6ah alternatively digital versatile disk, players, floppy drives, and the like. These devices are typically added to increase the functionality of the information handling system as desired by a user. However, the installation of such devices in the information handling system may be very labor intensive.

For instance, the installation of a power supply in an information handling system may involve the use of screws, typically seven, to attach the power supply to the chassis. Usually, these screws are small making them difficult to manipulate and install. Additionally, because of their small size, the screws may be dropped by an assembler, possibly causing damage to the information handling system due to shorts, lodging in moving parts, and the like.

Further, the upgrade and repair of information handling system devices has become increasingly complicated. For example, a user may need to replace a power supply in the information handling system. However, the removal of an old power supply may require the user to remove a plurality of screws to release the old power supply and the installation of additional screws to install the new power supply. This may require a significant amount of time, as well as result in a loss of components, such as the screws and other attaching hardware.

Further, other mounting systems configured for improved installation are typically not suitable for installation of heavy devices, such as power supplies. For example, a mounting system configured for the retention of a hard disk drive may not be able to support a heavier device, such as a power supply. Thus, a device retention mechanism is not available that is suitable for mounting heavy devices in an improved manner over traditional mounting methods utilizing screws.

Additionally, the installation of a power supply in an information handling system, whether by screws, nuts, rivets or otherwise, generally requires the use of tools to perform the installation. Furthermore, tools of general applicability, such as a screwdriver of standard size, may not be of such dimensions as to allow ease of installation, and so specialized tools may be required for installation of the power supply. It would be desirable that an improved device retention method be tool-less.

In addition, other mounting systems, even if configured for tool-less installation, require the user to employ multiple fingers or multiple handgrips for actuation. It would be desirable that an improved device retention method be actuated by way of a single finger.

Therefore, it would be desirable to provide an improved device retention apparatus.

SUMMARY OF THE INVENTION

Accordingly, the present invention is directed to a method and apparatus of mounting a device in an information handling system. In a first aspect of the present invention, a device retention mechanism suitable for mounting a device in a chassis includes a chassis suitable for receiving a device. The chassis has a first side and a second side. A retention member is mounted to the first side of the chassis to enable the retention member to exert a force against a device, thereby clamping the device between the retention member and the second side of the chassis.

In a second aspect of the present invention, a device retention mechanism suitable for mounting a device in a chassis includes a chassis suitable for receiving a device. A device has a first side and a second side, the first side positioned generally opposing the second side. A retention member is mounted to the chassis for exerting a force against the first side of the device, thereby applying the force from the retention member to the first side and from the second side of the device to a second side of the chassis. Thus, the device is secured to the chassis.

In a third aspect of the present invention, a device retention mechanism suitable for mounting a device in a chassis, includes a chassis suitable for receiving a device. The chassis has a first side, a second side, and a third side, the first side oriented generally perpendicular to the second side, and the third side oriented generally perpendicular to the first side and the second side. A retention member is mounted to the first side of the chassis for securing a device to the housing. A tab mounted to at least one of the first side and third side of the chassis.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 11, exemplary embodiments of the present invention are shown. There are a variety of devices that may be added to a chassis, such as a case of an information handling system, to increase functionality. To install and remove these devices, such as power supplies, compact disc read-only memories (CD-ROM), digital versatile disc (DVD), disk drives such as a hard disk, floppy disk, floppy/optical disk, and the like, typically required a time consuming effort to install and replace. For example, one complication of the installation process involves the use of small screws used to secure the device to the chassis, which may require the use of tools by an assembler to install the device in the chassis. Accordingly, the present invention provides a method and apparatus for the installation and removal of devices in a chassis in an efficient manner. For example, the present invention may provide an improved device retention mechanism for the installation of a device without requiring the use of tools, and further that embodiments of the present invention allow a user to actuate the mechanism for retaining the device with one finger.

Figure 1:
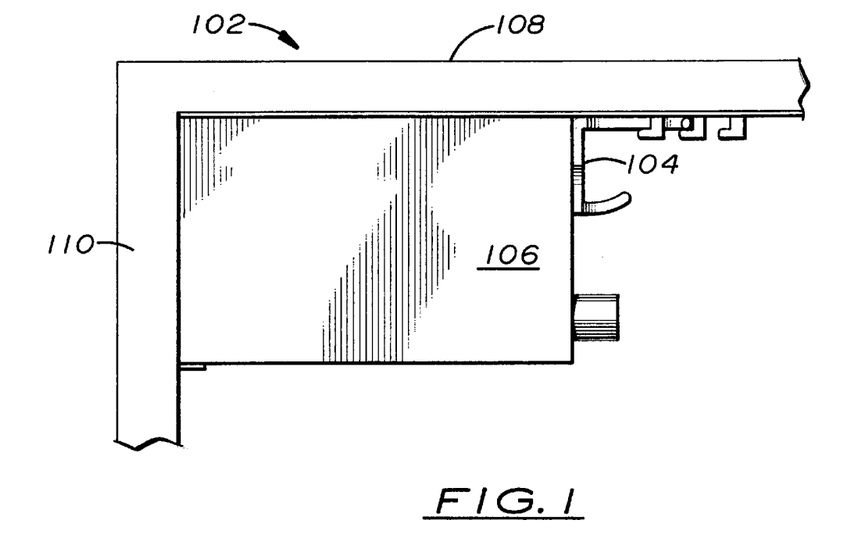
FIG. 1 is an illustration of an exemplary embodiment of the present invention wherein a device is secured to a chassis utilizing a retention member mounted to the chassis.

Referring now to FIG. 1, an illustration of an exemplary embodiment of the present invention is shown wherein a device is secured to a chassis utilizing a retention member mounted to the chassis. A chassis 102 includes a retention member 104 for securing a device 106 to the chassis 102. The retention member 104 may be formed from plastic, composite, metal and the like without departing from the spirit and scope of the present invention The chassis 102 includes a first side 108 and a second side 110. The first side 108 may be oriented generally perpendicular to the second side 110. The retention member 104 is mounted to the first side 108 of the chassis 102. Preferably, the retention member 104 is mounted to the chassis 102 to enable the retention member 104 to exert a force against the device 106. Thus, the device 106 is clamped between the retention member 104 and the second side 110 of the chassis 102. For example, the force exerted by the retention member 104 against the device 106 may force the device 106 against the second side 110 of the chassis 102, thereby securing the device 106 to the chassis 102.

Figure 2:
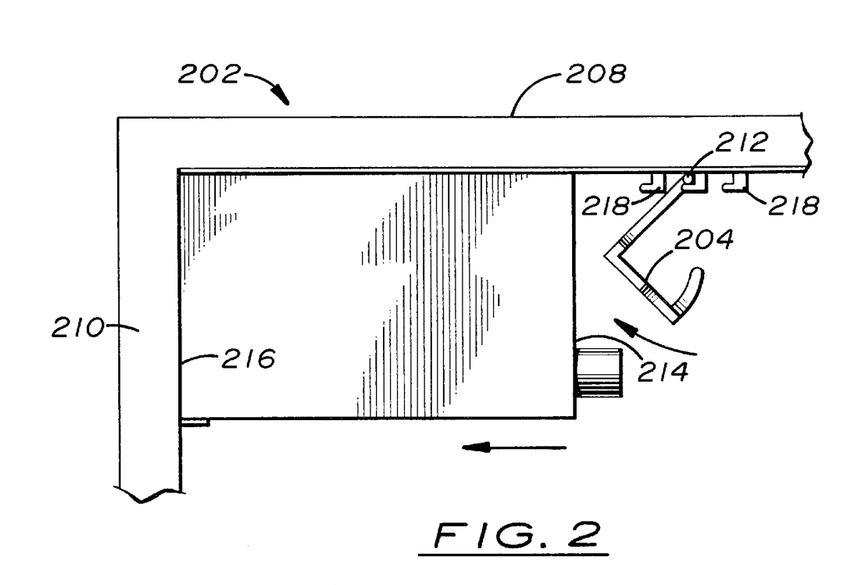
FIG. 2 is an illustration of a side view of an exemplary embodiment of the present invention wherein a chassis includes a retention mechanism for applying a force to a device to retain the device in the chassis.

For example, as shown in FIG. 2, in an exemplary embodiment of the present invention, a chassis includes a retention mechanism for applying a force to a device to retain the device in the chassis. A chassis 202 includes a retention member 204 for securing a device 206 to the chassis 202. The chassis 202 may include a first side 208 oriented generally perpendicular to the second side 210. Additionally, the retention member 204 may be formed so as to correspond to the junction between the device 206 and the chassis 202. For example, the retention member 204 may include a first retention side and a second retention side oriented generally perpendicular to each other. The retention member 204 is pivotally mounted 212 to the first side 208 of the chassis 202. Thus, as the retention member 204 pivots about the pivot point 212, the retention member 204 applies a force against a first side 214 of the device 206. This force causes the second side 216 of the device 206 to contact the second side 210 of the chassis 202, securing the device 206 to the chassis 202.

Further, it may be desirable to enable the retention member to be mounted at a plurality of positions for mounting a variety of standardized devices. For example, the retention member 204 may be mounted at a standardized distance from the second side 216 of the chassis to accept an ATX power supply. Additional mounts 218 may be provided at varying distances for accepting other devices, such as hard drives, CD-ROMs, floppy drives, and the like so as to increase the flexibility of the present invention. Further, it may be desirable to form the mounts 218 while "stamping" the first portion 208 of the chassis 202 to further improve manufacture efficiency the present invention.

Figure 3:
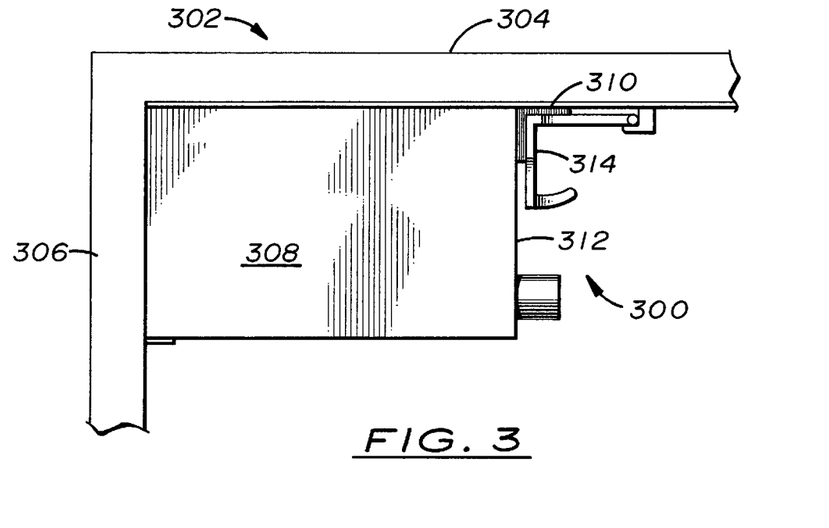
FIG. 3 is an illustration of an exemplary embodiment of the present invention wherein a retention member engages a retainer included on a device, the retainer suitable for securing the device to a chassis.
Figure 4:
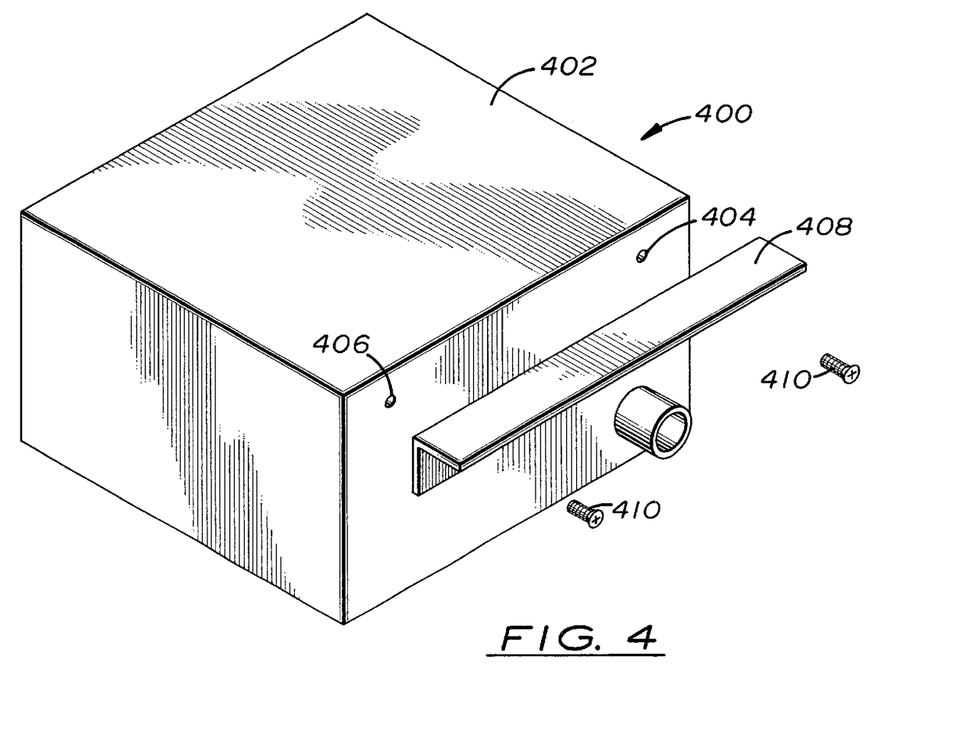
FIG. 4 is an isometric drawing of an exemplary embodiment of the present invention wherein a retainer is formed for mounting on standardized devices.

Referring now to FIG. 3, an exemplary embodiment 300 of the present invention is shown wherein a retention member engages a retainer included on a device for securing the device to a chassis 302. The chassis 302 includes a first side 304 and a second side 306. A device 308 includes a retainer 310 for providing additional securing to the device 308. For example, the retainer 310 may be mounted to the first side 312 of a device 308 to help further prevent the device 308 from slipping past the retention member 314 due to jarring of the chassis 302. Thus, the device 308 is securing in an improved manner.

The retainer may be configured for mounting on standardized devices. For example, as shown in an exemplary embodiment 400 in FIG. 4, an ATX power supply 402 includes two screw holes 404 and 406 for traditional mounting in a chassis 302 (FIG. 3). However, these screw holes 404 and 406 may also be utilized to mount a retainer 408 with screws 410 so as to provide increased holding ability. Thus, the present invention may be utilized without extensive modifications to the device, in this instance a power supply 402. Thus, the present invention may offer improved installation and removal even on heavy devices, such as power supplies. For example, previous mounting methods, while suitable for devices that are typically lighter, such as hard disk drives and the like, were unsuitable for use with a heavier device, such as a power supply. Thus, power supplies still had to utilize traditional mounting methods using screws. However, the present invention provides an improved mounting and removal method and apparatus that is suitable for use on heavier devices, such as power supplies, without the use of screws.

Figure 5:
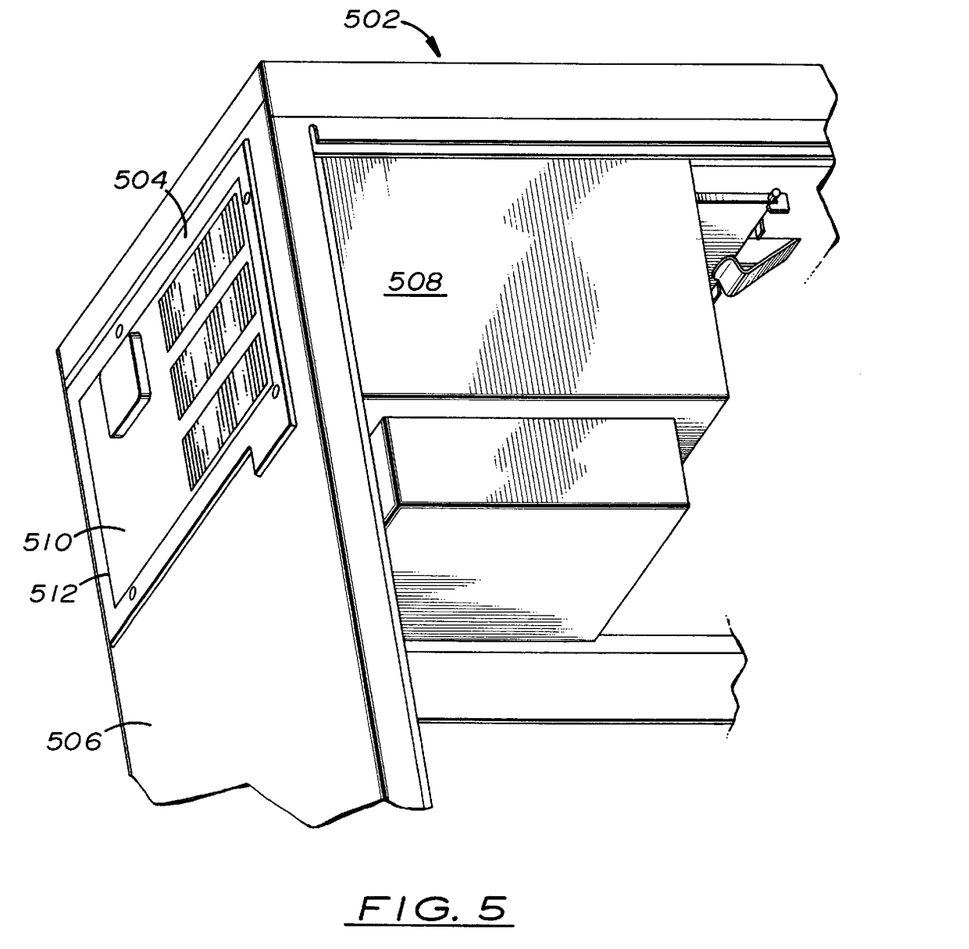
FIG. 5 is an isometric drawing of an exemplary embodiment wherein a device is mounted in a chassis, the chassis including a recess suitable for accepting a device.

Referring now to FIG. 5, an exemplary embodiment of the present invention is shown where a device is mounted in a chassis, the chassis including a recess suitable for accepting a device. The chassis 502 may include a recess 504 formed in a second side 506 of the chassis 502. Preferably, the recess 504 corresponds to a device 508 so as to secure a second side 510 of the device to the chassis 502 The recess 504 may also include an aperture 510 to provide ventilation for the device 508, such as a power supply, and/or access to the device 508, such as a floppy drive, removable media device, and the like as contemplated by a person of ordinary skill in the art. Further, it may be desirable to form the recess 504 and/or aperture 510 as the second side 506 of the chassis 502 is stamped-out.

Figure 6:
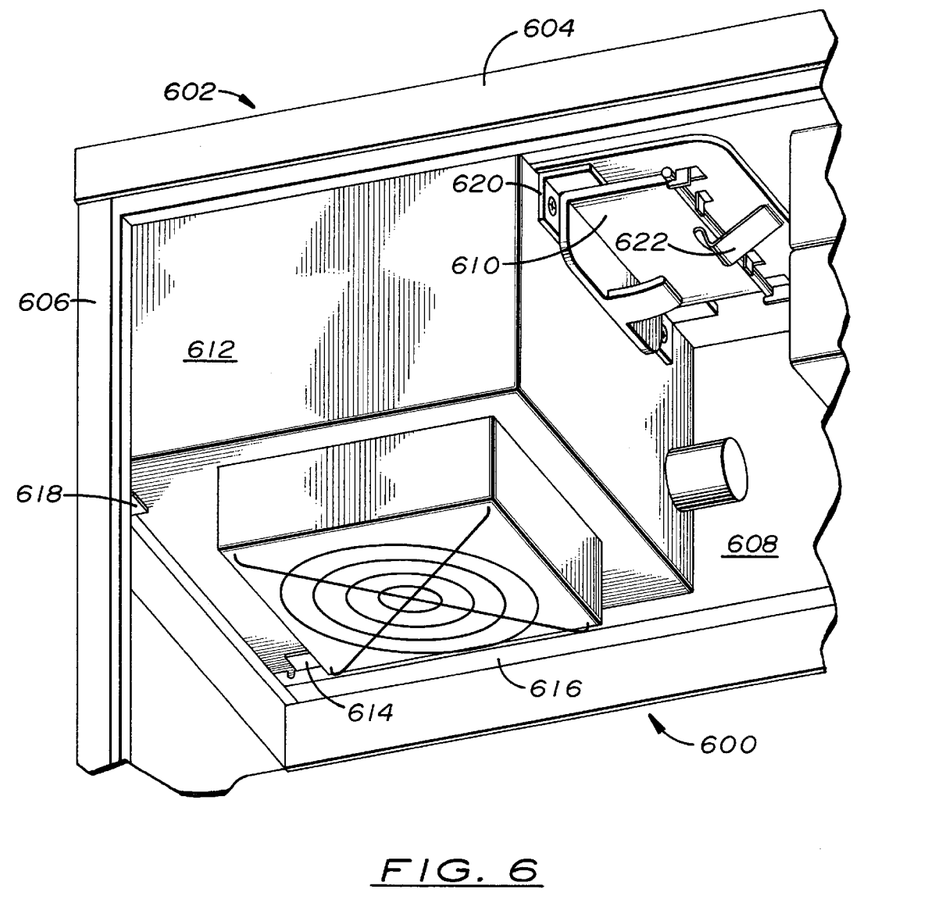
FIG. 6 is an isometric drawing of an exemplary embodiment wherein a device retention apparatus includes a tab mounted to a chassis, the tab suitable for securing a device.

Referring now to FIG. 6, an exemplary embodiment 600 of the present invention is shown wherein a device retention apparatus includes a tab mounted to a chassis, the tab suitable for securing a device. A chassis 602 may include a first side 604, a second side 606 and a third side 608. The first side 604 is oriented generally perpendicular to the second side 606, and the third side 608 is oriented generally perpendicular to the first side 604 and the second side 606. A retention mechanism 610 is mounted to the first side 604 for securing a device 612 to the chassis 602. A tab 614 is mounted to the third side 608, the tab 614 suitable for securing the device 612. Preferable, the tab 614 is placed at a distance from the first side 604 corresponding to a dimension of a device 612 to be mounted. Thus, the device 612 is further secured to the chassis 612. Additionally, the tab 614 may be extended to form a rail 616 to further support the device 612. It should be apparent that a tab 614 of the present invention may be formed in a variety of shapes without departing from the spirit and scope of the present invention, as well as be mounted at a variety of locations, such as including a tab 618 on the first side 604 of the chassis 602. Further, utilizing a tab may diminish the need of utilizing a force supplied by the retention member 610 to secure the device to the housing. For example, the tab 614 and/or retainer 620 may be used to support the device 612 to the chassis 602. Thus, the retention member 610 does not need to utilize a force against the device 612 to keep the device 612 secured to the chassis 602.

To install a device 612 in the chassis 602, the device is inserted into the chassis so as to engage the tab 614. The device 612 is then slid against the tab 614 toward the second side 606 of the chassis 602. A retention member 610, pivotally mounted to the first side 604 of the chassis 602, is rotated until the retention mechanism 610 engages the retainer 618, thereby securing the device 612 to the chassis 602. It may be preferable to include a biasing mechanism 622 with the retention mechanism 610 to bias the retention mechanism 610 in a secured position. Thus, the device may be installed in a vastly improved manner over previous installation methods that required the use of screws and tools.

Figure 7:
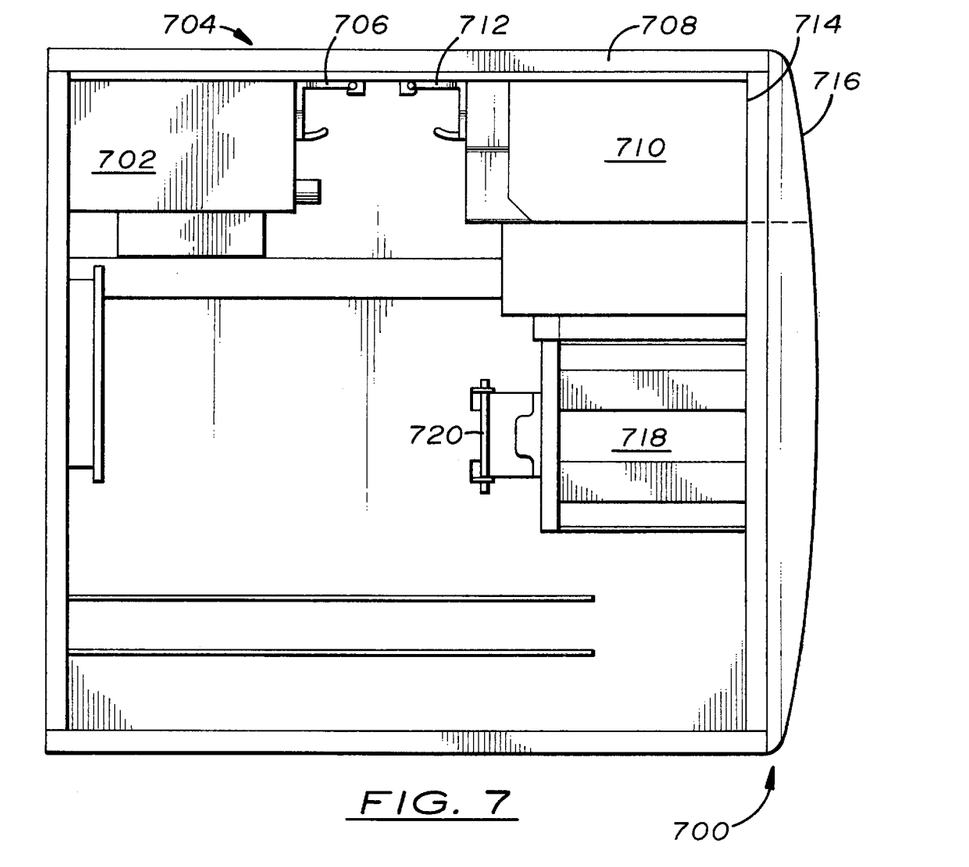
FIG. 7 is an illustration of an exemplary embodiment of the present invention wherein pluralities of device retention apparatus are utilized to secure a variety of devices in a chassis.

Referring now to FIG. 7, an exemplary embodiment 700 of the present invention is shown wherein multiple device retention apparatus are utilized to secure a variety of devices in a chassis. A first device 702, in this instance a power supply, is secured to the rear portion of the chassis 704 utilizing a retention member 706 mounted to the top portion 708 of the computer chassis 702. A second device 710, such as a compact disc read-only memory (CD-ROM), digital versatile disc (DVD), floppy drive, and the like is mounted utilizing a retention member 712 to the front 714 of the chassis 704. An aperture 716 may be provided to access the devices 710 when secured to the chassis 704. Therefore, the devices may be accessed in a traditional manner yet still utilize the improved mounting and removal capabilities of the present invention. Further, a third device, such as a hard disk drive, RAID array 718, and the like, may be mounted internally in the chassis 704 utilizing a retention member 720. In this instance, the devices are secured to the front 714 of the chassis, yet are accessible from the side of the chassis 704. It should be apparent that a variety of orientations and positions of a device mounting apparatus of the present invention may be utilized without departing from the spirit and scope thereof, the previous examples are merely exemplary embodiments thereof.

Figure 8:
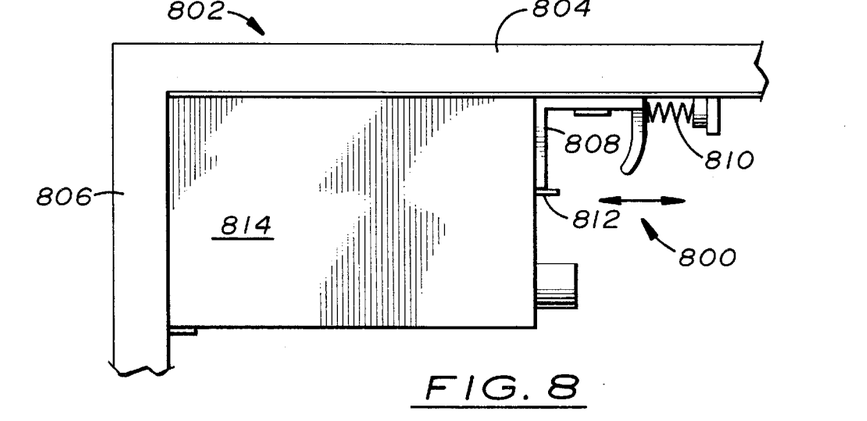
FIG. 8 is an illustration of an exemplary embodiment of the present invention wherein a retention member is slideably mounted to a chassis, the retention member suitable for securing a device to the chassis.

Referring now to FIG. 8, an exemplary embodiment 800 of the present invention is shown wherein a retention member is slideably mounted to a chassis, the retention member suitable for securing a device to the chassis. The chassis 802 includes a first portion 804 and a second portion 806. A retention member 808 is slideably mounted to the first portion 804 of the chassis 802. A biasing mechanism 810 is included for biasing the retention member 808 to the secured position. Thus, the retention mechanism 808 may be grasped, preferably with the use of a grasping portion 812, to increase the distance between the retention member 808 and the second portion 806 of the chassis, thereby permitting insertion and/or removal of a device 814 from the chassis 802. Additionally, by slideably mounting the retention member 808, devices with a variety of dimensions may be secured. For example, the retention member may be able to secure a hard drive or a compact disc read-only memory (CD-ROM) without having to readjust the retention member, even though the length of the two devices is different.

Figure 9:
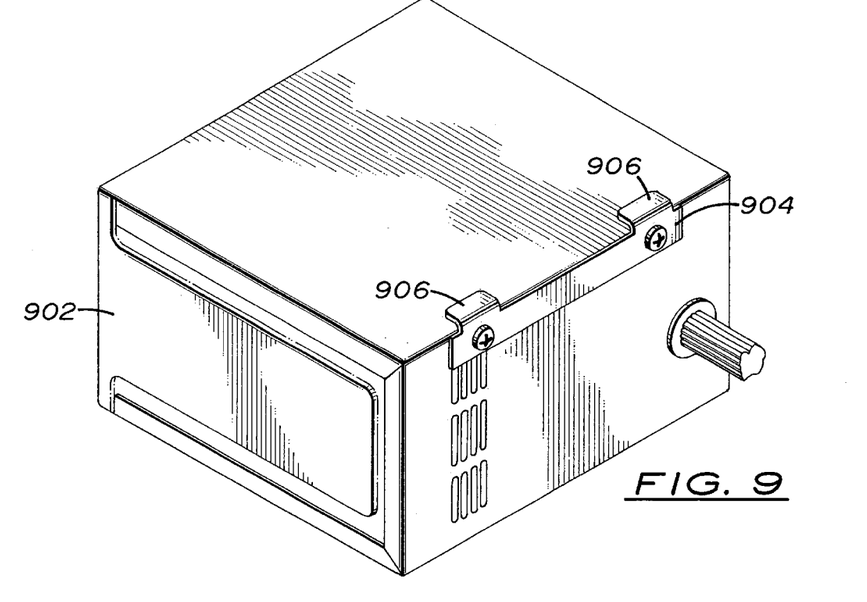
FIGS. 9, 10 and 11 are illustrations of an exemplary embodiment wherein a device is mounted to a chassis utilizing a receptacle suitable for receiving an engaging member disposed on the power supply.
Figure 10:
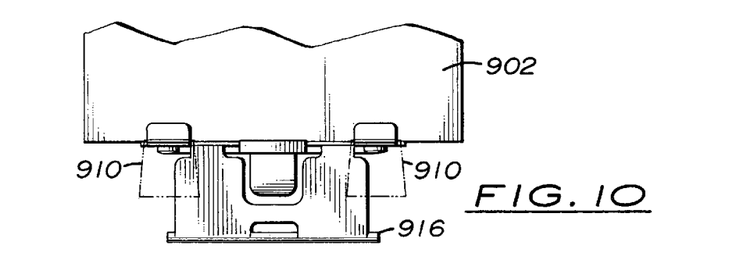
Figure 11:
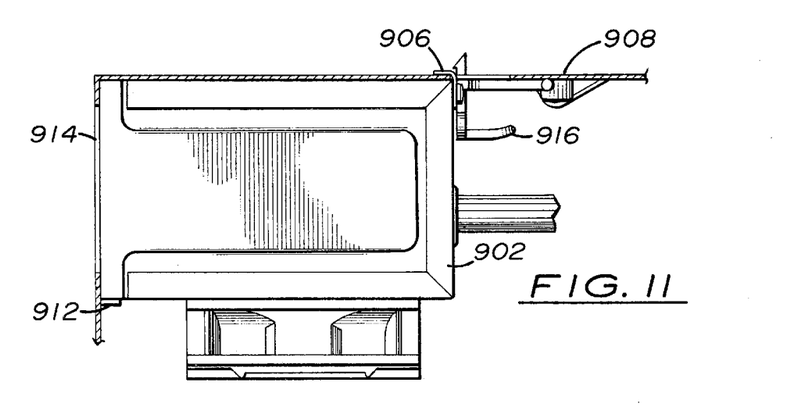

Referring now to FIGS. 9, 10 and 11, an exemplary embodiment of the present invention is shown wherein a device is mounted to a chassis utilizing a receptacle suitable for receiving an retainer including an engaging member, the retainer disposed on the device. A device, in this instance a power supply 902, may include a retainer 904 formed with engaging members 906 to further secure the power supply 902 in a chassis 908. The engaging members 906 are formed to correspond with receptacles 910 disposed on the chassis 908. In this instance, the engaging members 906 are formed so as to extend over the power supply 902.

Therefore, to install the power supply 902 in the chassis 908, the engaging members 906 are inserted into the receptacles disposed on the chassis 908. The power supply 902 is then slid toward a second side 914 of the chassis 908 thereby securing the rear portion of the power supply 902 with a tab 912 disposed on the chassis 908, and further securing the engaging members 906 of the retainer 904 to the receptacles 910. Then, the retention member 916 is rotated to a securing position, thereby preventing the engaging members 906 from separating from the receptacles 910 and also keeping the power supply 902 secured with the use of the tab 912. In this way, a heavy device, such as a power supply, may be installed in an improved manner in a chassis without the use of tools, thereby saving both lime and money. Although the engaging member is shown disposed on the power supply and the receptacle is shown disposed in the chassis, it should be apparent that the engaging member may be mounted to the chassis and the receptacle mounted to the power supply without departing from the spirit and scope of the present invention.

It is believed that the method and apparatus for removal and assembly of a device within a chassis of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A device retention mechanism suitable for mounting a device in a chassis, comprising:

a chassis suitable for receiving a device, the chassis having a first side and a second side;

a retention member mounted to the first side of the chassis, wherein the retention member is mounted to the chassis to enable the retention member to exert a force against the device, thereby clamping the device between the retention member and the second side of the chassis, wherein the retention member is at least one of pivotally mounted and slideably mounted to the first side of the chassis, the second side of the chassis being oriented generally perpendicular to the first side of the chassis, the second side of the chassis suitable for receiving a second side of the device; and a retainer mounted to the device, the retainer suitable for being engaged by the retention member.

2. The device retention mechanism as described in claim 1, wherein the retention member is capable of assuming a first position and a second position, and wherein the first position is suitable for securing the device in the chassis and the second position is suitable for releasing the device from the chassis.

3. The device retention mechanism as described in claim 2, wherein the retention member includes a biasing mechanism suitable for biasing the retention mechanism toward the first position.

4. The device retention mechanism as described in claim 2, wherein the retention member includes a first retention side and a second retention side oriented generally perpendicular to each other.

5. The device retention mechanism as described in claim 1, wherein the retainer includes a first retainer side and a second retainer side, the first retainer side generally perpendicular to the second retainer side.

6. The device retention mechanism as described in claim 1, wherein the second side of the chassis includes a recess suitable for receiving the device.

7. The device retention mechanism as described in claim 1, further comprising a retainer disposed on the device, the retainer including an engaging member suitable for engaging a receptacle disposed on the chassis.

8. A device retention mechanism suitable for mounting a device in an information handling system chassis, comprising:

a device having a first side and a second side, the first side positioned generally opposing the second side;

a chassis suitable for receiving the device;

a retention member, wherein the retention member is mounted to the chassis to enable the retention member to exert a force against the first side of the device, thereby applying the force from the retention member to the first side and from the second side of the device to a second side of the chassis, thereby securing the device to the chassis, wherein the retention member is at least one of pivotally mounted and slideably mounted to a first side of the chassis, the second side of the chassis being oriented generally perpendicular to the first side of the chassis, the second side of the chassis suitable for receiving the second side of the device; and a retainer mounted to the device, the retainer suitable for being engaged by the retention member.

9. The device retention mechanism as described in claim 8, wherein the retention member is capable of assuming a first position and a second position, and wherein the first position is suitable for securing the device in the chassis and the second position is suitable for releasing the device from the chassis.

10. The device retention mechanism as described in claim 9, wherein the retention member includes a biasing mechanism suitable for biasing the retention mechanism toward the first position.

11. The device retention mechanism as described in claim 9, wherein the retention member includes a first retention side and a second retention side oriented generally perpendicular to each other.

12. The device retention mechanism as described in claim 8, wherein the retainer includes a first retainer side and a second retainer side, the first retainer side generally perpendicular to the second retainer side.

13. The device retention mechanism as described in claim 8, wherein the second side of the chassis includes a recess suitable for receiving the second side of the device.

14. The device retention mechanism as described in claim 8, further comprising a retainer disposed on the device, the retainer including an engaging member suitable for engaging a receptacle disposed on the chassis.

15. A device retention mechanism suitable for mounting a device in a chassis, comprising:

a chassis suitable for receiving a device, the chassis having a first side, a second side, and a third side, the first side oriented generally perpendicular to the second side, and the third side oriented generally perpendicular to the first side and the second side; and a retention member mounted to the first side of the chassis, wherein the retention member is mounted to the chassis to enable the retention member to secure the device to the chassis, wherein the retention member is at least one of pivotally mounted and slideably mounted to the first side of the chassis, the second side of the chassis being oriented generally perpendicular to the first side of the chassis, the second side of the chassis suitable for receiving a second side of the device;

a tab mounted to at least one of the first side and third side of the chassis, the tab suitable for receiving the device; and a retainer mounted to the device, the retainer suitable for being engaged by the retention member.

16. The device retention mechanism as described in claim 15, wherein the retention member is capable of assuming a first position and a second position, and wherein the first position is suitable for securing a device in the chassis and the second position is suitable for releasing a device from the chassis.

17. The device retention mechanism as described in claim 16, wherein the retention member includes a biasing mechanism suitable for biasing the retention mechanism toward the first position.

18. The device retention mechanism as described in claim 16, wherein the retention member includes a first retention side and a second retention side oriented generally perpendicular to each other.

19. The device retention mechanism as described in claim 15, wherein the retainer includes a first retainer side and a second retainer side, the first retainer side generally perpendicular to the second retainer side.

20. The device retention mechanism as described in claim 15, wherein the second side of the chassis includes a recess suitable for receiving the device.

21. The device retention mechanism as described in claim 15, further comprising a retainer disposed on the device, the retainer including an engaging member suitable for engaging a receptacle disposed on the chassis.

22. A device retention mechanism suitable for mounting a device in a chassis, comprising:

a chassis suitable for receiving a device, the chassis having a first side and a second side, the first side of the chassis being parallel to and covering a first side of the device, the second side of the chassis being oriented generally perpendicular to the first side of the chassis, the second side of the chassis suitable for receiving a second side of the device; and a retention member comprising a first face and a second face substantially perpendicular to the first face, the retention member being mounted to the chassis to enable the second face of the retention member to exert a force against the device while the first face is oriented parallel to the first side of the chassis, thereby clamping the device between the retention member and the second side of the chassis;

wherein the retention member is pivotally mounted to the first side of the chassis, an axis of rotation of the retention member being on a planar surface of the first side of the chassis and being parallel to an intersection of the first side of the chassis and the second side of the chassis.

* * * * *